United States Patent
Gladyshev et al.

(10) Patent No.: US 7,778,407 B2
(45) Date of Patent: Aug. 17, 2010

(54) STATISTICAL APPROACH TO AUTOMATIC GAIN CONTROL FOR MANAGING AUDIO MESSAGES OVER A NETWORK

(75) Inventors: Eugene Gladyshev, Los Gatos, CA (US); Ramkumar Ramani, Sunnyvale, CA (US); Madhu Yarlagadda, Los Altos, CA (US); Erik James Reed, Dublin, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1493 days.

(21) Appl. No.: 11/131,459

(22) Filed: May 16, 2005

(65) Prior Publication Data
US 2006/0256776 A1   Nov. 16, 2006

(51) Int. Cl.
*H04M 1/00* (2006.01)
*H04M 9/00* (2006.01)
*H03G 3/00* (2006.01)

(52) U.S. Cl. ............................. 379/388.03; 379/390.01; 379/390.03; 379/395; 381/104; 381/107

(58) Field of Classification Search ................. 370/352; 381/107, 104; 719/318; 235/380; 379/52, 379/390.01, 395, 390.03; 704/260
See application file for complete search history.

(56) References Cited

U.S. PATENT DOCUMENTS

| | | | |
|---|---|---|---|
| 5,642,428 A * | 6/1997 | Nowack | 381/107 |
| 5,710,806 A * | 1/1998 | Lee et al. | 379/52 |
| 6,567,419 B1 | 5/2003 | Yarlagadda | |
| 7,159,768 B2 * | 1/2007 | Kromann et al. | 235/380 |
| 2004/0032860 A1 | 2/2004 | Mundra et al. | |
| 2004/0160979 A1 | 8/2004 | Pepin et al. | |
| 2004/0193422 A1 * | 9/2004 | Fado et al. | 704/260 |
| 2004/0205775 A1 * | 10/2004 | Heikes et al. | 719/318 |
| 2004/0264714 A1 * | 12/2004 | Lu et al. | 381/104 |

FOREIGN PATENT DOCUMENTS

EP    1161038 A2    12/2001

(Continued)

OTHER PUBLICATIONS

"P10 Amplifier", Plantronics, 1 page, http://www.plantronics.com/north_america/en_US/products/cat1200043/cat1200043/prod440142.

(Continued)

*Primary Examiner*—Thjuan K Addy
(74) *Attorney, Agent, or Firm*—Frommer Lawrence & Haug LLP; Jamie L. Wiegand (57) ABSTRACT

A system, method, and apparatus are directed towards managing an audio message, such as a Voice over Internet Protocol (VOIP) message over a network. The invention employs a statistical mechanism to automatically optimize a gain control for setting a volume of an audio message being sent by a client device. An initial gain value is automatically adjusted based, in part, on a statistical sampling of energy levels in the audio message. Environmental factors, such as a sound card within the client device, background noise, and the like, may also be considered through a setting of a servo coefficient that may be used to map between volume levels and decibel levels. The servo coefficient may also be adjusted based, at least in part, on decibel (dB) feedback information from a destination device for which the audio message is intended.

25 Claims, 4 Drawing Sheets

FOREIGN PATENT DOCUMENTS

WO    WO 01/78430 A1    10/2001

OTHER PUBLICATIONS

"About Plantronics", pp. 1-3, http://www.rly.com/plan.html.

"The easy way to bring hands-free convenience to PBX and ACD operators.", pp. 1-2, http://freeshippingtoday.com/p10plugprona.html.

"Plantronics Products & Accessories Guide", pp. 1-38, http://freeshippingtoday.com/p10plugprona.html.

* cited by examiner

STATISTICAL APPROACH TO AUTOMATIC GAIN CONTROL FOR MANAGING AUDIO MESSAGES OVER A NETWORK

BACKGROUND OF THE INVENTION

The present invention relates generally to network communications, and more particularly, but not exclusively, to an apparatus, system, and method for automatically managing a microphone volume for audio messages, such as a Voice over Internet Protocol (VOIP) over a network.

Internet Protocol (IP) Telephony, also known as VOIP, is a technology that makes it possible to have a voice conversation over an IP network, such as the Internet, instead of a dedicated voice transmission line.

Depending on the service, one way to place a VOIP call is to employ specialized phones, sometimes called IP Phones, or VOIP phones, that may look like a normal phone. Such VOIP phones may connect to the network through an RJ-45 connector, or operate through a wireless connection.

Because VOIP make it possible to have voice conversations over IP networks, VOIP allows for a cost effective alternative to the traditional public switched telephone networks (PSTNs). Because of its relatively lower costs and ease of use, VOIP phone services have been rapidly increasing in popularity. With such an increase in popularity, there has been an increased desire to be able to integrate at least some of the VOIP features with a variety of other communication services.

However, during a communications between parties, perhaps when at least one of the parties is speaking, or otherwise providing an audio communications, their microphone volume may be adjusted improperly. A possible result is that the party with the improperly adjusted volume may believe that a message is being sent properly, when it might not be the case. For example, consider where the party is attempting to leave a voice mail message, or other audio message. When their microphone's volume is improperly adjusted, the voice mail message, or other audio message, could be sent at such a volume that a listener might not be able to adequately understand the voice mail message or other audio message. This could be the case even when the listener attempts to adjust a volume to a speaker device. In some instances, volume adjustments to the speaker device might even result in amplifying background noise, making it more difficult to understand the voice mail message, or other audio message. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed towards a system, method, and apparatus for managing an audio message, such as a Voice over Internet Protocol (VOIP) message over a network. The invention employs a statistical mechanism to automatically optimize a gain control for setting a volume of the audio message being sent by a client device. A gain value is automatically adjusted over time based, in part, on a statistical sampling of energy levels in the audio message. Volume energy samples are collected within a selection window, with outlier samples being discarded. When a ratio of samples above a dB target to a number of samples below the dB target is at or above a good sample ratio (GSR), the volume level of the audio message being sent over the network may be adjusted. If the determined ratio for a given sample selection set is below the GSR, the sample selection set may be discarded to minimize effects of erratic sample behaviors.

In one embodiment, environmental factors, such as a sound card, background noise, and the like, may also be considered through a setting of a servo coefficient that is useable to map between volume levels and decibel (dB) levels. The servo coefficient may also be adjusted based, at least in part, on dB feedback information from a destination device for which the audio message is intended. In one embodiment, the dB feedback information is included within a Real-time Transport Control Protocol (RTCP) report from the destination device.

In addition, although the present invention is described with respect to automatically adjusting a volume level of an input from a microphone device, or similar audio receiving device, the invention is not so constrained. For example, the invention may also be employed to automatically adjust a volume level of an audio output device, such as a speaker device. Thus, in one embodiment, the invention may be used to automatically adjust a volume to an audio signal that may be synchronized, or otherwise, associated with a video file.

Illustrative Operating Environment

Figure 1:
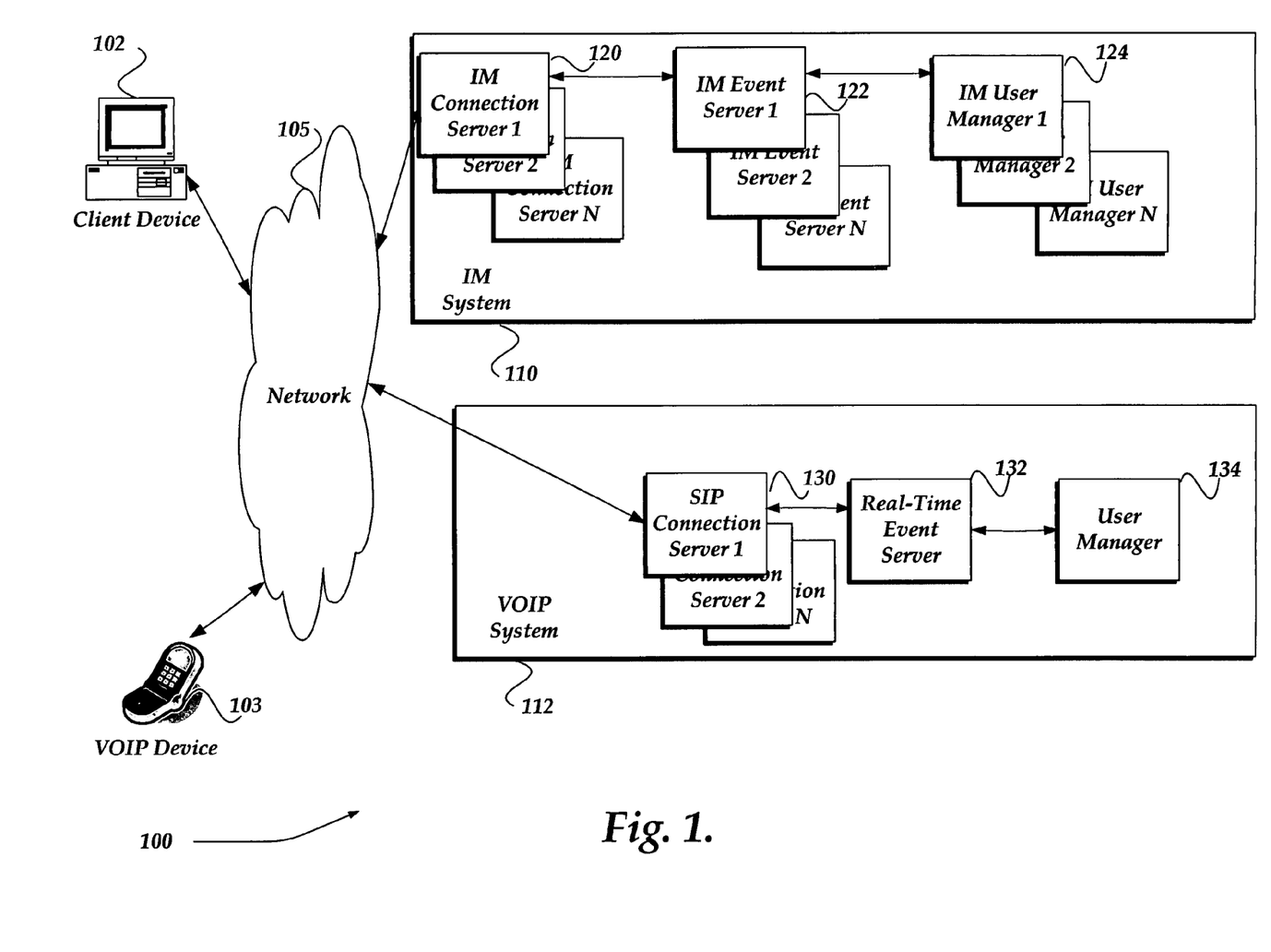
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client device 102, VOIP device 103, network 105, IM system 110, and VOIP system 112. IM system 110 may include IM connection servers 120, IM event servers 122, and IM user managers 124. VOIP system 112 includes SIP connection servers 130, real-time event server 132, and user manager 134.

Client device 102 is in communication with IM connection servers 120, SIP connection servers 130, and VOIP device 103, through network 105. VOIP device 103 is also in communication with IM connection servers 120 and SIP connection servers 130 through network 105. IM event servers 122 are in communication with IM connection servers 120 and IM user managers 124. Real-time event server 132 is in communication with SIP connection servers 130 and user manager 134.

VOIP device 103 may include virtually any device that is arranged to send and receive audio communications and messages such as VOIP messages via one or more wired and/or wireless communication interfaces. Typically, VOIP device 103 may be configured to communicate using any of a variety of protocols. For example, VOIP device 103 may be configured to employ RTP for communicating media data such as audio and video to another device. However, the invention is not so limited, and another media data mechanism may be employed, including IAX, and the like. VOIP device 103 may also employ the SIP protocol for enabling setting up a session and enabling such actions as dialing a number, enabling a ring, a ring-back tone, busy signal, and the like. However, other signaling protocols may also be employed, including H.323, Skinny Client Control Protocol (SCCP), IAX, MiNET, and the like. Moreover, VOIP device 103 may employ any of a variety of real-time communication protocols useable for voice, video, text, instant messaging, or the like.

VOIP device 103 may also be configured to provide various status reports to another device. Such status reports may provide information associated with a received audio message. For example, VOIP device 103 may provide information such as a number of packets dropped, jitter information, packet latency, a dB level of the received audio message, and the like, to a sending device. In one embodiment, VOIP device 103 may employ a Real-time Transport Control Protocol (RTCP) report to provide at least some of this information. However, the invention is not so limited, and virtually any mechanism may be employed to provide feedback information about a received audio message to a sending device.

VOIP device 103 may also be configured to provide an identifier, sometimes known as an originating line identifier (OLI) during a communication. The identifier may employ any of a variety of mechanisms, including a device model number, a carrier identifier, a mobile identification number (MIN), and the like. The MIN may be a telephone number, a Mobile Subscriber Integrated Services Digital Network (MS-ISDN), an electronic serial number (ESN), or other device identifier. The OLI may also be an IP address associated with VOIP device 103. In one embodiment, the identifier is provided with each communication. In another embodiment, the identifier is provided by an end-user. VOIP device 103 may also send a user ID and password that enables it to login to another device, service, or the like. The other device may choose to perform local authentication and respond back to VOIP device 103, or send this information to SIP connection servers 130, the IM connection server 120, or the like, for remote authentication and/or authorization.

Devices that may operate as VOIP device 103 include personal computers, desktop computers, smart phones, Personal Digital Assistants (PDAs), handheld computers, programmable consumer electronics, standard telephones configured with an analog telephone adaptor (ATA), an IP phone, a mobile device, and the like.

One embodiment of client device 102 is described in more detail below in conjunction with FIG. 2. Briefly, however, client device 102 may include virtually any computing device capable of receiving and sending a message over a network, to and from another computing device, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may be further configured to communicate messages, such as audio message, VOIP message, voice mail messages, and the like, over network 105 to and from a remote device such as IM connection servers 120, VOIP device 103, SIP connection servers 130, and the like. As such, client device 102 may operate substantially similar to VOIP device 103 with respect to VOIP communications. Client device 102 may also manage such audio messages using an IM client (not shown).

Client device 102 may be configured with a microphone, or similar device for sending audio messages. Client device 102 may further be configured to automatically manage a volume control of the microphone for audio messages. In one embodiment, client device 102 may manage the volume control using a statistical mechanism for automatically varying a gain control associated with the volume of the microphone or other audio interface. Client device 102 may further receive feedback information from another device, such as a destination device for the audio message. Such feedback information may be useable, at least in part, by client device 102 to further vary the volume control. In one embodiment, the information may be received in an RTCP report. However, the invention is not so limited, and client device 102 may receive information in virtually any form. Moreover, client device 102 may be configured to automatically manage the volume control, virtually independent of feedback information from the destination device.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices, such as remote device 106 with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

IM system 110 is configured to manage IM sessions between client devices employing an IM client. IM system 110 may employ IM connection servers 120, IM event servers 122, and IM user managers 124 to manage one or more IM sessions. In one embodiment, IM connection servers 120, IM event servers 122, and IM user managers 124 may represent separate server processes operating with a single computing device. In another embodiment, IM connection servers 120, IM event servers 122, and IM user managers 124 may represent distinct processes operating across multiple computing devices. As such, IM system 110 may be implemented on a variety of computing devices including personal computers, desktop computers, multiprocessor systems, microprocessor-based devices, network PCs, servers, network appliances, and the like.

IM connection servers 120 are configured to receive a request to establish an IM session from an IM client, such as might be included within client device 102, and the like. IM connection servers 120 may also receive from the IM client authentication information that may be employed to authenticate an end-user of the IM client. If the end-user is authenticated, IM connection servers 120 may enable the IM client to log into the IM session. IM connections servers 120 may also be configured to provide information about the established session to IM event servers 122.

IM connections servers 120 may also forward various request information from the IM client to IM event servers 122. Such request information may include, for example, a request to locate and communicate with another IM end-user.

IM event servers 122 are configured to receive the end-user's log in and other request information from IM connections servers 120. IM event servers 122 may request IM user managers 124 to store information about the IM client and end-user. IM user mangers 124 may employ a table, spreadsheet, file, database, and the like, to register the IM client, and on which IM connection server, within IM connection servers 120, the IM client is logged into. Thus, IM user managers 124 may store information about various IM conversations that may include such information as identifiers for end-users associated with an IM conversation, time information, account identifiers for the end-users, IM connection servers associated with an IM conversation, and so forth. As such, IM event servers 122 may also employ IM user managers 124 to determine which IM connection server, within IM connection servers 122, another end-user is logged into, and provide such information to IM connection servers 120, so that an IM session may be established between two or more IM end-users.

VOIP system 112 is configured to manage VOIP sessions between client devices using any of a variety of IP telephony protocols. VOIP system 112 is further configured to enable a variety of client devices and client applications to access voice mail messages.

As shown, VOIP system 112 may be implemented in a single computing device, with each of the illustrated components operating as one or more processes with the single computing device. VOIP system 112 may also be implemented across multiple computing devices, with one or more of the illustrated components distributed across the multiple computing devices. As such VOIP system 112 may be implemented on a variety of computing devices including personal computers, desktop computers, multiprocessor systems, microprocessor-based devices, network PCs, servers, network appliances, and the like.

SIP connection servers 130 may be configured to receive a request to establish a SIP connection from client device 102, VOIP device 103, and the like. The requesting device may provide identification information to SIP connection servers 130 that may be used, at least in part, to authenticate the request to establish the SIP connection. If the requesting device is authenticated, SIP connection servers 130 may enable the requesting device to log into a connection. SIP connection servers 130 may also provide information about the requesting device to real-time event server 132. Real-time event server 132 may be configured to receive the information and provide it to user manager 134 for storage.

User manager 134 may store the information in a database, spreadsheet, table, file, and the like. Such information may include, for example, an identifier associated with the requesting device, an end-user associated with the requesting device, an address associated with SIP connection servers 130, and the like. User manager 134 may receive and manage such information for a plurality of requesting device. User manager 134 may also provide information to real-time event server 132 about at least one other requesting device, such that SIP connection servers 130 may enable a VOIP communication between one or more end-users.

Illustrative Client Device

Figure 2:
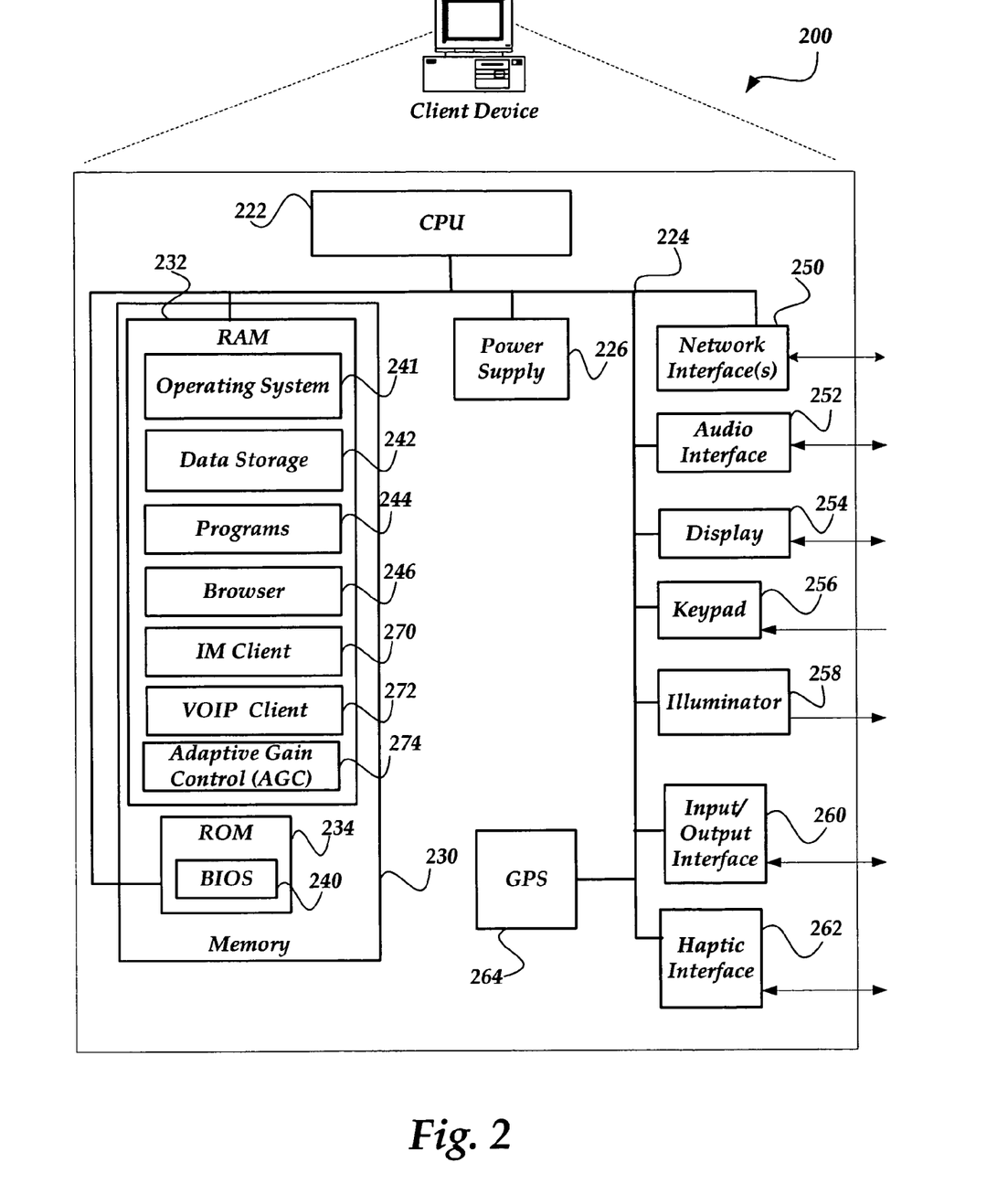
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, audio interface 252, display 254, keypad 256, illuminator 258, input/output interface 260, haptic interface 262, and optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, and the like.

Audio interface 252 is arranged to produce and receive audio signals such as the sound of a human voice. For example, audio interface 252 may be coupled to a speaker and microphone (not shown) to enable audio telecommunication with others and/or generate an audio acknowledgement for some action. Thus, in one embodiment audio interface 252 may represent a sound card, or the like.

Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like.

Programs 244 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, and so forth. In addition, mass memory 230 stores browser client 246, IM client 270, VOIP client 272, and adaptive gain control (AGC) 274.

Browser 246 may be configured to receive and to send web pages, web-based messages, and the like. Browser 246 may, for example, receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like.

IM client 270 may be configured to initiate and manage an instant messaging session, including, but not limited to AOL Instant Messenger, Yahoo! Messenger, NET Messenger Server, ICQ, and the like. In one embodiment, IM client 270 is configured to employ a VOIP client, such as VOIP client 272 to integrate IM/VOIP features. Thus, in one embodiment, IM client 270 may employ SIP to establish media sessions with another computing device employing an IM/VOIP capable client, and RTP to communicate the media traffic. However IM client 270 is not so limited. For example, IM client 270 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, and the like.

VOIP client 272 is configured to enable client device 200 to initiate and manage a VOIP session with another client device. VOIP client 272 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, SCCP, Megaco, MGCP, MiNET, Skinny Client Control Protocol (SCCP), and the like. VOIP client 272 is further configured to employ a variety of speech codecs to compress the media stream for communicating it over the network, including G.711, G.729, G.729a, iSAC, Speex, and the like. In one embodiment, SIP may be employed to enable a Session Description Protocol (SDP). Moreover, VOIP client 272 may also receive status reports from another device associated with audio messages. In one embodiment VOIP client 272 may receive status reports in the form of RTCP reports. However, the invention is not so limited, and virtually any other report or reporting mechanism may be employed.

Although not shown, client device 200 may also be configured to receive a message from another computing device, employing another mechanism, including, but not limited to email, Short Message Service (SMS), Multimedia Message Service (MMS), internet relay chat (IRC), mIRC, and the like.

AGC 274 is configured to automatically manage a volume control to an audio message, such as a Voice over Internet Protocol (VOIP) message, voice mail message, and the like, over a network. In one embodiment, AGC 274 may receive an audio message from audio interface 252 and automatically modify a gain control associated with the audio message to adjust a volume for the audio message. AGC 274 may then provide the adjusted gain to audio interface 252, or adjust the volume of the audio message prior to enabling access to it by another component such as VOIP client 272, IM client 270, or the like.

AGC 274 may automatically adjust the gain based, in part, on a statistical sampling of energy levels in the audio message. Environmental factors, such as a sound card within the client device, background noise, and the like, may also be considered through a servo coefficient that may also be used to map between volume levels and decibel levels. The servo coefficient may also be adjusted based, at least in part, on dB feedback information from a destination device for which the audio message is intended. In one embodiment, AGC 274 may receive the dB feedback information from VOIP client 272, or the like. Moreover, AGC 274 may employ a process substantially similar to that described below in conjunction with FIG. 4 to perform at least some of its actions.

Although AGC 274 is illustrated within RAM 232, the invention is not so limited. For example, AGC 274 may be implemented on a separate processing card, within audio interface 252, or the like, without departing from the scope or spirit of the invention.

Generalized Operation

Figure 3:
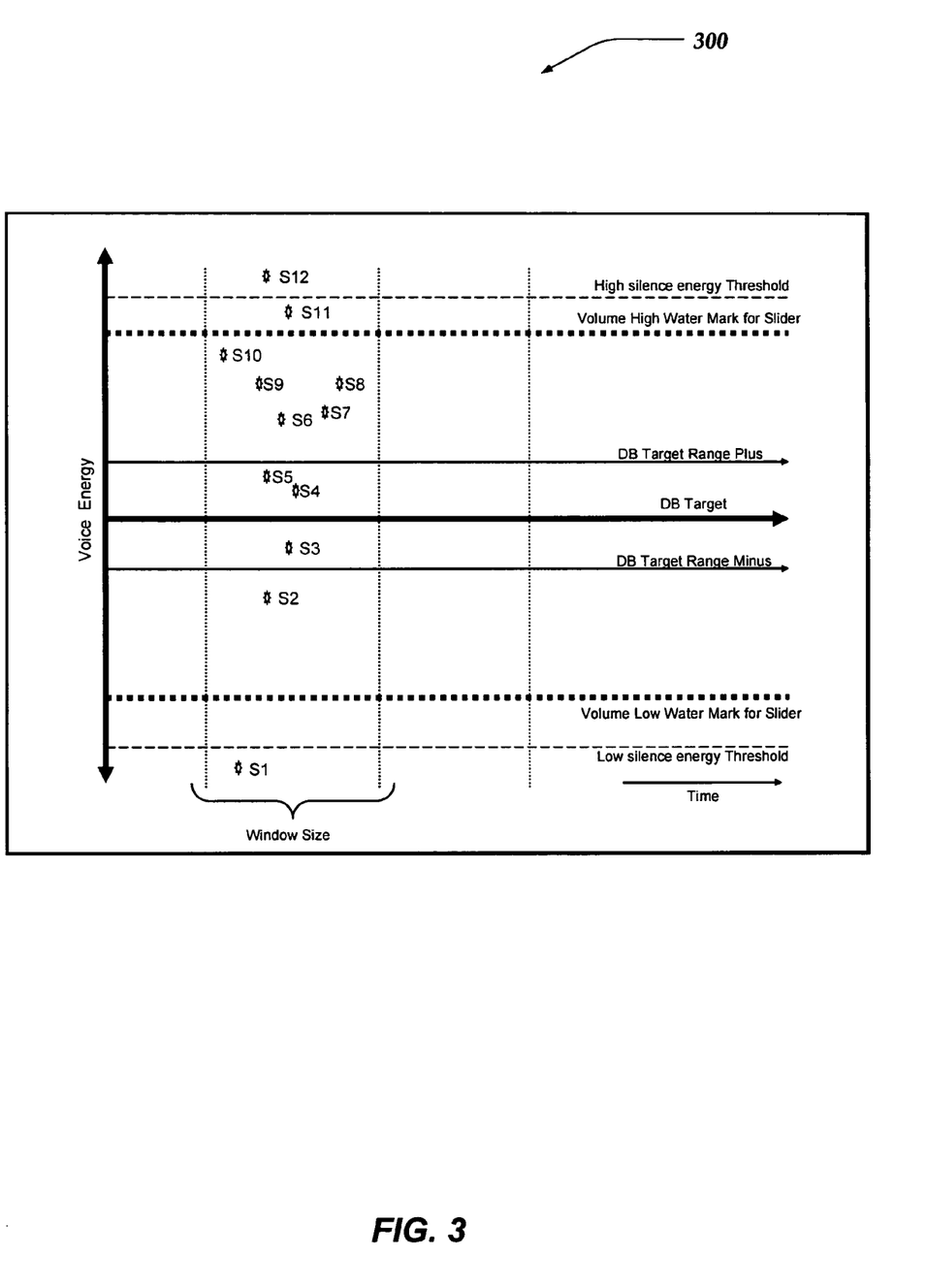
FIG. 3 shows one example of an embodiment of audio energy graph for use in implementing the invention.

The operation of certain aspects of the invention will now be described with respect to FIGS. 3-4. FIG. 3 shows one example of an embodiment of an audio energy graph for use in implementing the invention. FIG. 3 may provide an example, useable in understanding process 400 of FIG. 4.

Energy graph 300 may include many more or less components than those shown. The graph shown, however, is sufficient to disclose an illustrative embodiment for practicing the invention.

As shown in the figure, energy graph 300 shows voice (or audio) energy level (in dB) extending along the y-axis, and time extending along the x-axis. Several control factors are provided that are next described.

Such control factors include a high silence energy threshold that is a static learner threshold useable when a volume level is determined to be at 100%. If it is determined that a received audio sample's dB is above this threshold, the sample may be discarded as an outlier. Similarly included is a low silence energy threshold useable when a volume level is determined to be at zero %. If a received audio sample's dB is below this threshold, the sample may be discarded as an outlier.

Also shown is dB target range plus, and dB target range minus. These control factors may be employed to establish a high and low boundary, respectively, for a target area of acceptable audio samples.

Similarly, the dB target indicates an optimal dB target value for an audio message. If an adaptive threshold determination is enabled then the dB target may be set to about an adaptive threshold. In one embodiment, the adaptive threshold is determined as a percentage of a running average of audio samples. Typically, the percentage may be between about 0% and about 100%, however, in one embodiment, the adaptive threshold is about 80% of the running average. If the adaptive threshold determination is disabled then the dB target may be set to some predefined value, such as approximately half way between about the high silence energy threshold and low silence energy threshold. However, the dB target determination need not be constrained to this value, and virtually any other value may be selected.

Energy graph 300 further illustrates a volume high water mark for slider, and a volume low water mark for slider. These control factors are employable as maximum and minimum volumes, respectively, and are directed towards minimizing a likelihood that a microphone is under or over driven. Typically, these control factors are set to a percentage of the high or low silence energy thresholds, however, the invention is not so limited, and virtually any set of values may be employed. Moreover, such water marks need not be symmetric around the dB target, although they may also be symmetric.

Also illustrated is a window size that may be selected based on a variety of criteria and useable to set a number of audio samples to select for the statistical analysis. The window size may be based on engineering judgment, based on a statistical analysis, and the like. Typically, the window size is around 10-1000 samples; however, virtually any window size greater than one may be employed, without departing from the scope or spirit of the invention. Moreover, the window may be implemented as a sliding window, a step moving window, a statically sized window, or the like. The window size can be based on a variety of factors. For example, one factor is the number of samples. Another factor includes a duration for which the samples are taken. In one embodiment the number of samples may be set to about 50, while the duration of the samples may be set to about 40 msec. However, both the duration and duration of samples may be varied. Thus, the number of samples may include any value, such as those between about 10 to about 1000 while the duration may include a value with a range between about 10 msec to about 500 msec. In general the range and duration are inversely proportional. For example, if the duration is larger then a small number of samples may be employed and similarly if the duration is small, a large number of samples may be employed. However, the invention is not constrained to the above guidelines, or ranges, and virtually any range, or similar guidelines may be employed.

S1-S12 illustrates examples of various audio samples obtained for the provided window at a given time. These audio samples may be used to illustrate the process described below in conjunction with FIG. 4.

Although not shown, the present invention employs a variety of other control factors, including the following.

Enable ADaPtive (ADP): represent a flag that may used to enable or disable the adaptive silence thresholds. This flag is used to a determination of a running average for a sliding window that has "N" number of samples in the window.

Enable/Disable Flag: This flag may enable or disable the AGC 274 component.

Good Sample Ratio (GSR): This includes a sliding window that monitors a number of samples in the window. Samples that are below the dB target may be considered as bad and those above may be considered good. If the ratio of good samples to bad samples is below the GSR then the entire window of samples may be considered to be bad and the process may start over again. On the other hand if the number of good samples to bad samples is at or above the GSR then a further determination may be made whether to either increase the microphone gain or decrease it, as described in more detail below in conjunction with FIG. 4. GSR may be set to virtually any value between about one and about 100, inclusive, including, for example, 6:1, 3:1, 9:1, 2:1, or virtually any other level of sensitivity desired.

Max Volume Change: This parameter may be used to set a maximum amount of change in volume at any given time. If the number of good samples is determined to be greater than the GSR then the volume may be changed at a rate limited by the max volume change control factor.

Sample Count: Number of samples that are to be counted. This may include the window size.

Sampling Frequency: This includes how often a sample is taken. Generally this is number is between about 20 msec. to about 200 msec, inclusive. However, the invention is not so limited, and virtually any sampling frequency may be selected. During this interval maximum and average voice energy levels may be determined.

Servo Coefficient: This parameter may be used to map a volume level to a dB level. It may represent a multiplying factor applied to the volume level so that it can be mapped to dB levels. The servo coefficient may be determined based on studies of various sound cards, audio interfaces, headsets, typical background sounds, and the like. The servo coefficient may be set to a static value, or be dynamically determined. The servo coefficient also may be dynamically adjusted based on feedback information from a destination device. In one embodiment, the servo coefficient is dynamically set based on dB feedback obtained through an RTCP report. The servo coefficient typically represents a value between about zero and about 10, inclusive. For example, in one embodiment, a static value of the servo coefficient may be set to about Trigger Delta: We have samples above a target area and below the target area. This value is useable to define the ratio between the above and below samples based on an action taken. This value may be established at any number based on engineering judgment, statistical analysis, and the like. For example, in one embodiment trigger delta is set to about 15.

Figure 4:
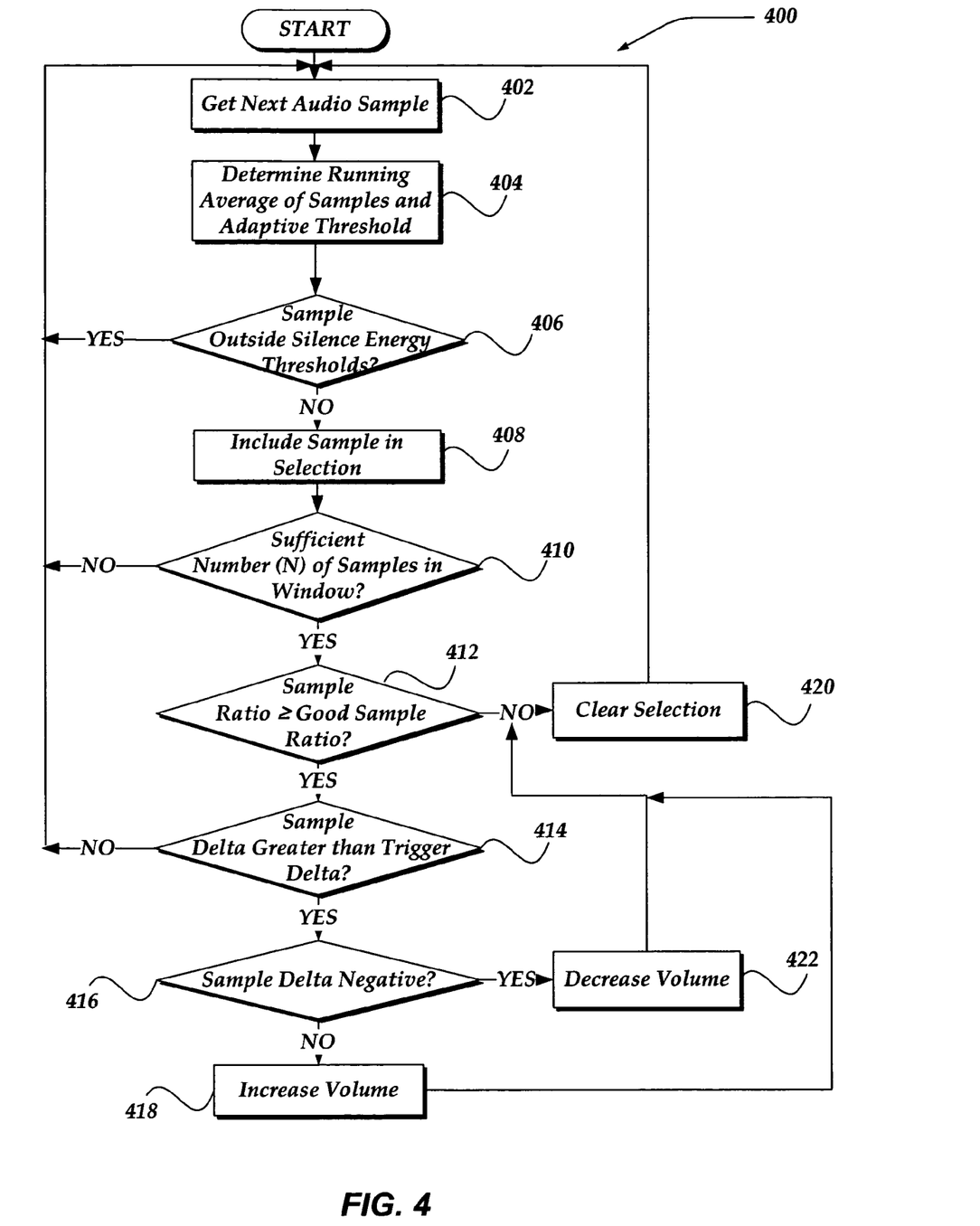
FIG. 4 illustrates a logical flow diagram generally showing one embodiment of a process for managing a volume control at a client of an audio message over a network; in accordance with the present invention.

FIG. 4 illustrates a logical flow diagram generally showing one embodiment of a process for managing a volume control at a client of an audio message over a network; in accordance with the present invention. Process 400 may be implemented within AGC 274 of FIG. 2, for example.

Process 400 begins, after a start block, at block 402 where a next audio sample is obtained. As audio samples are typically sampled from an audio input over time, block 402 may include an implicit wait mode that is configured to wait for the next audio sample. Such waits may be a function of the sampling frequency described above.

Processing continues next to block 404, where a running average of samples may be determined. In the first pass, the total samples may include only a first sample. However, as the audio message is sampled over time, the running average may eventually represent an average of samples over the entire audio message. In addition, at block 404 the adaptive threshold useable to determine the dB target as described above in conjunction with FIG. 3 may be determined.

Processing flows next to decision block 406, where a determination is made whether the received sample is outside of the predetermined silence energy thresholds. Referencing FIG. 3, consider S1 as the sample being evaluated. In this example, S1 is illustrated as having an energy level that is below the low silence energy threshold. Consider also sample S12. S12 is above the high silence energy threshold. If the sample is outside the silence energy thresholds, the sample is discarded, and the process loops back to block 402, to obtain a next audio sample. If the sample evaluated is within the silence energy thresholds, however, processing continues to block 408, where the sample is included within the selection of samples. Thus, samples S1 and S12 would be discarded.

Processing next flows to decision block 410, where a determination is made whether a sufficient number, N, of samples have been included in the selection set. If they have not, processing loops back to block 402, to get a next audio sample; otherwise, processing continues to decision block 412.

At decision block 412, a determination is made whether the sample ratio of positive samples to negative samples, as described above, is at or above the GSR. Referring back to FIG. 3, S2 is above the low silence energy level, and below the dB target range minus. Thus, it is considered a negative sample for purposes of comparing to the GSR. S3 is between the dB target and dB target range minus. Thus, it is not considered because it is within the dB target ranges. S4 and S5 are similarly within dB target ranges, thus they are also not counted. S6 through S11, inclusive, are above the dB target range plus and are considered as positive samples for purposes of comparing to the GSR. In this example, the ratio of positive to negative samples is 6:1. As described above, the GSR may be set to virtually any value. However, if at decision block 412, the ratio of positive samples to negative samples is at or above the GSR, then processing proceeds to block 420 where the entire selection set of samples are cleared, so that a new sample selection set may be evaluated. Clearing of the selection is directed towards minimizing adverse influences of erratic audio samples. Processing then would loop back to block 402 to get a next sample.

If however, the GSR is not exceeded, at decision block 412, processing proceeds to decision block 414. Reaching this decision block indicates that the volume of the audio message may need to be adjusted. To confirm this, a determination is next made whether the sample delta comprising a number of samples above the db target to those below exceeds a trigger delta. If the sample delta does not exceed the trigger delta, processing loops back to block 402 to obtain a next audio sample. Otherwise, processing flows next to determine whether the sample delta indicates that the volume is too high (negative sample delta) or too low (positive sample delta). If the sample delta is negative, processing proceeds to block 422; otherwise, processing proceeds to block 418.

At block 418, an average of the samples in the selection window is determined. This selection average may then be deducted from the dB target value to obtain a dB delta. As described above, in one embodiment, the dB target value may represent the running average of all audio samples for this audio message. The delta volume shift may then be determined based on combining the db delta with the servo coefficient.

In addition, the delta volume shift may be limited based on various limiters. For example, in one embodiment, the delta volume shift may be rate limited. In this embodiment, the delta volume shift may be rate limited based on the maximum volume change control factor described above. In another embodiment, the delta volume shift may also magnitude limited using the high and/or low water mark control factors described above. Moreover, the delta volume shift may be both rate and magnitude limited. In any event, the limited delta volume may then be employed to raise the volume for the audio message being sent. Processing then proceeds to loop back to block 402 to get another audio sample.

At block 422, a substantially similar determination as described for block 418 is performed. However, at block 422, the limited delta volume shift is directed at lowering the volume level of the audio message being sent. Processing then proceeds to loop back to block 402 to get another audio sample.

Process 400 of FIG. 4 continues to loop until there are no more samples at block 402, in which case, processing may return to another calling process, end, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended and introduced hereafter.

What is claimed as new and desired to be protected by Letters Patent of the United States is:

1. A method for use in managing an audio message over a network, comprising:
    receiving a set of audio samples of the audio message;
    determining a target based, in part, on a running average of the received set of audio samples;
    determining a ratio of audio samples above the target to audio samples below the target;
    if the determined ratio of audio samples is about at or above a good sample ratio (GSR), and a delta of audio samples above the target to audio samples below the target exceeds a trigger delta, automatically adjusting a volume associated with the audio message, wherein the automatically adjusted audio message is transmittable over the network.

2. The method of claim 1, wherein determining a ratio of audio samples above the target threshold to audio samples below the target further comprises, excluding any audio samples that have a magnitude that exceed a silence energy threshold magnitude.

3. The method of claim 1, wherein the audio message is associated with at least one of an input from microphone, or an output of a speaker device.

4. The method of claim 1, wherein the method is integrated into an Instant Messaging application.

5. The method of claim 1, wherein the audio message is sampled at between about 20 milliseconds to about 200 milliseconds to obtain the set of audio samples.

6. The method of claim 1, wherein the audio samples represent an energy level in decibels at a sample time for the sampled audio message.

7. The method of claim 1, wherein determining a ratio of audio samples above the target threshold to audio samples below the target further comprises determining the ratio of audio samples if a total of audio samples in the set of audio samples is at least equal to a predefined window size.

8. The method of claim 1, wherein determining the target further comprises a predetermined percentage of the running average of received audio samples.

9. The method of claim 1, wherein automatically adjusting the volume further comprises:
    subtracting the running average from the target; and
    determining a delta volume shift by multiplying the results of the subtraction step with a servo coefficient, wherein the delta volume shift is useable to automatically adjust the volume of the audio message.

10. The method of claim 9, wherein the delta volume shift is at least one of magnitude limited or rate limited.

11. The method of claim 9, wherein the servo coefficient is determined based, at least in part, on one of an RTCP report, a characteristic of a sound card, and a background noise.

12. The method of claim 1, further comprising:
    if the determined ratio of audio samples is below the good sample ratio (GSR),
    clearing the audio samples, and
    receiving another set of audio samples.

13. The method of claim 1, wherein the method is implemented within a client device that is configured to provide the audio message to a remote device, wherein the audio message is automatically volume controlled prior to sending to the remote device.

14. The method of claim 1, wherein the method is implemented within a mobile device.

15. The method of claim 1, wherein the audio message is at least one of a voice mail, an audio stream associated with a video stream, or a VOIP message.

16. A client device for use in managing a volume control of an audio message over a network, comprising:
   a transceiver for receiving and sending information to another computing device;
   a processor in communication with the transceiver; and
   a memory in communication with the processor and for use in storing data and machine instructions that causes the processor to perform a plurality of operations, including:
      receiving a set of audio samples of the audio message;
      determining a target based, in part, on a running average of the received set of audio samples;
      determining a ratio of audio samples above the target to audio samples below the target; and
      if the determined ratio of audio samples is about at or above a good sample ratio (GSR), automatically adjusting a volume associated with the audio message.

17. The client device of claim 16, wherein automatically adjusting the volume, further comprises, automatically adjusting the volume if a delta of audio samples above the target to audio samples below the target exceeds a trigger delta.

18. The client device of claim 16, where in the plurality of operations can be integrated into an Instant Messaging application.

19. The client device of claim 16, wherein determining a ratio of audio samples above the target threshold to audio samples below the target further comprises, excluding any audio samples that have a magnitude that exceed a silence energy threshold magnitude.

20. The client device of claim 16, wherein determining a ratio of audio samples above the target threshold to audio samples below the target further comprises determining the ratio of audio samples if a total of audio samples in the set of audio samples is at least equal to a predefined window size.

21. The client device of claim 16, wherein automatically adjusting the volume further comprises:
   subtracting the running average from the target;
   determining a delta volume shift by multiplying the results of the subtraction step with a servo coefficient;
   limiting at least one of a magnitude or a rate of the delta volume shift; and
   employing the limited delta volume shift to automatically adjust the volume of the audio message.

22. A system for managing an audio message over a network, comprising:
   a client device for use automatically controlling a volume of the audio message, and configured to perform a plurality of operations, including:
      receiving a set of audio samples of the audio message;
      determining a target based, in part, on a statistical analysis of the received set of audio samples;
      if an audio sample within the set of audio samples is outside of a silence energy threshold, discarding the audio sample;
      determining a ratio of audio samples above the target to audio samples below the target, wherein the ratio of audio samples ignores the discarded audio sample;
      if the determined ratio of audio samples is about at or above a good sample ratio (GSR), automatically adjusting a volume associated with the audio message; and
      sending the adjusted audio message over the network; and
   a destination device in communication with the client device and configured to perform a plurality of operations, including:
      receiving the adjusted audio message; and
      providing to the client device a report associated with the received audio message, wherein the report is useable by the client device to further control the volume of the audio message at the client device.

23. The system of claim 22, wherein the statistical analysis further comprises determining a running average of the received set of audio samples.

24. The system of claim 22, wherein automatically adjusting the volume further comprises:
   subtracting the running average from the target;
   employing the received report from the destination device, to determine a servo coefficient;
   determining a delta volume shift by multiplying the results of the subtraction step with the servo coefficient;
   limiting at least one of a magnitude or a rate of the delta volume shift; and
   employing the limited delta volume shift to automatically adjust the volume of the audio message.

25. An apparatus for managing an audio message over a network, comprising:
   a transceiver for receiving and sending information to a computing device over the network;
   means for determining a target value for an energy level for the audio message;
   means for determining a ratio of audio samples of the audio message above the target value to audio samples of the audio message below the target value; and
   if the determined ratio is about at or above a good sample ratio (GSR), employing a means for automatically adjusting a volume associated with the audio message prior to providing the audio message to a destination device.

* * * * *